(12) United States Patent
Emery

(10) Patent No.: US 7,367,679 B2
(45) Date of Patent: May 6, 2008

(54) LIGHT SOURCE FOR A DISPLAY DEVICE

(75) Inventor: William Emery, Sherwood, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 11/538,398

(22) Filed: Oct. 3, 2006

(65) Prior Publication Data

US 2007/0139937 A1  Jun. 21, 2007

Related U.S. Application Data

(60) Provisional application No. 60/723,603, filed on Oct. 3, 2005.

(51) Int. Cl.
| | |
|---|---|
| G03B 21/16 | (2006.01) |
| G03B 21/22 | (2006.01) |
| G03B 21/28 | (2006.01) |
| F21V 29/00 | (2006.01) |
| B60Q 21/06 | (2006.01) |

(52) U.S. Cl. ............................ 353/60; 353/61; 353/98; 353/119; 362/264; 362/294; 362/373

(58) Field of Classification Search .................. 353/52, 353/57, 58, 60, 61, 85, 98, 119; 362/294, 362/373, 188, 264, 298, 300

See application file for complete search history.

(56) References Cited

U.S. PATENT DOCUMENTS

| | | | | |
|---|---|---|---|---|
| 6,227,672 | B1 * | 5/2001 | Bortz ........................... | 353/96 |
| 6,231,191 | B1 * | 5/2001 | Shiraishi et al. ............... | 353/61 |
| 6,871,959 | B2 * | 3/2005 | Hsu et al. ...................... | 353/57 |
| 7,188,973 | B2 * | 3/2007 | Katsuma ..................... | 362/293 |
| 7,210,825 | B2 * | 5/2007 | Watanabe et al. ........... | 362/373 |
| 2005/0018151 | A1 * | 1/2005 | Kitabayashi et al. ........ | 353/119 |
| 2006/0232973 | A1 * | 10/2006 | Haga et al. .................. | 362/264 |

* cited by examiner

*Primary Examiner*—Melissa Jan Koval
(74) *Attorney, Agent, or Firm*—Alleman Hall McCoy Russell & Tuttle LLP

(57) ABSTRACT

A light source for a display device. The light source comprises a light-producing element, a reflector disposed around at least a portion of the light-producing element, a housing disposed substantially around the reflector, an airflow channel defined adjacent an outer wall of the housing by a separator structure, and an opening in the separator structure to allow airflow between the interior portion of the housing and the airflow channel.

7 Claims, 2 Drawing Sheets

LIGHT SOURCE FOR A DISPLAY DEVICE

CROSS REFERENCE TO RELATED APPLICATIONS

This application claims the benefit of U.S. Provisional Application No. 60/723,603, filed Oct. 3, 2005, the entirety of which is hereby incorporated herein by reference for all purposes.

TECHNICAL FIELD

The present disclosure relates generally to a display device, and to a light source for a display device.

BACKGROUND

There are many ways of projecting or displaying an image on a display surface. Typically, a display device includes a light source and an image-generation device. Light from the light source may be directed to the image-generation device which may project an image onto a display surface, such as a screen or wall.

Current light sources used in display devices may produce a significant amount of heat. Failure to reduce the heat level in the display device may reduce the lifetime of the light source and/or cause the light source to rupture.

SUMMARY

A light source for a display device is disclosed, the light source comprising a light-producing element, a reflector disposed around at least a portion of the light-producing element, a housing disposed substantially around the reflector, an airflow channel defined adjacent an outer wall of the housing by a separator structure located within the housing, and an opening in the separator structure to allow airflow between the interior portion of the housing and the airflow channel.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

An image display device and a light source for use with an image display device are described below. In the following description, for purposes of explanation, numerous specific details are set forth in order to provide a thorough understanding of the disclosed embodiments. It will be apparent, however, to one skilled in the art that the disclosed embodiments may be practiced without these specific details. In other instances, structures and devices are shown in block diagram form in order to avoid obscuring other elements of the disclosed embodiments.

Figure 1:
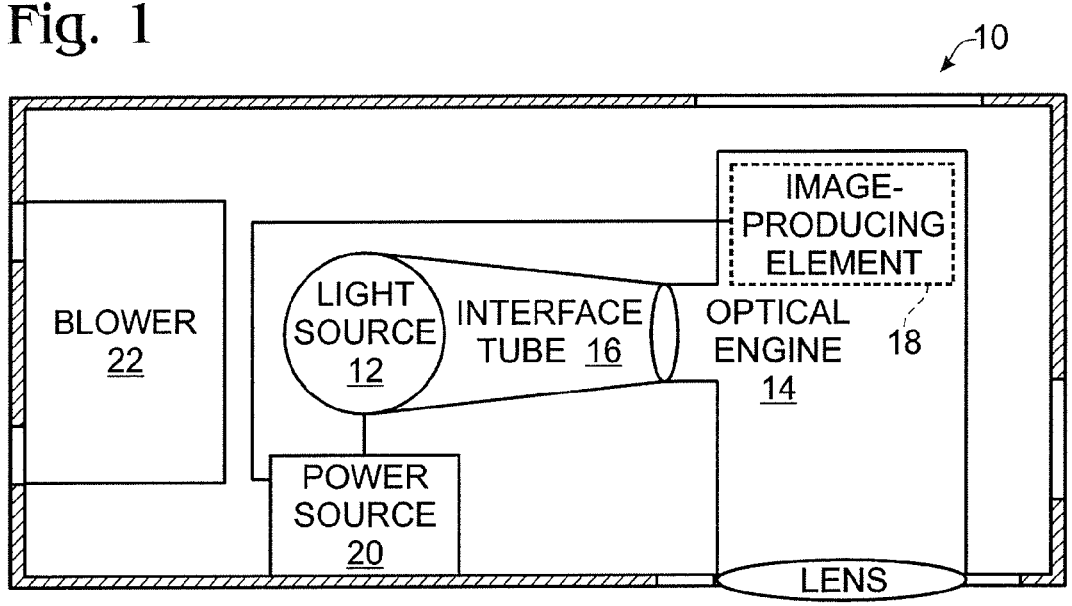
FIG. 1 is a schematic illustration of a display device according to an embodiment of the present disclosure.

Referring now specifically to FIG. 1, an exemplary display device 10 is illustrated. The display device 10 may be adapted to project an image on a display surface, including, but not limited to, a screen, a wall, or other viewing surface or area. In some embodiments, the display device 10 may be a projector or other image-display device that is able to project an image onto a display surface. As used herein, a display device may include any suitable display device or image projector, including, but not limited to, a digital projector, a liquid crystal display (LCD) projector, a digital light processing (DLP) projector, a rear projector, a front projector, etc. Although the foregoing examples deal with display devices, it should be noted that the light source described herein is not so limited. For example, a light source in accordance with one or more of the disclosed embodiments may be utilized in one or more imaging and/or non-imaging applications including, but not limited to the following: rear projection systems; front projection systems, liquid crystal display (LCD) systems; digital light projection (DLP) systems; stage lights; spot lights; headlights; reflective LCD; liquid crystal on silicon; and/or a wide variety of imaging and/or non-imaging systems.

In its most basic form, display device 10 includes a light source (for example, a lamp) 12 and an optical engine (or light engine) 14. Light source 12 may be adapted to produce a beam of light and project the light towards optical engine 14, which may be configured to generate an image. Light source 12 typically includes a lamp positioned within a reflector that is configured to direct most of the emitted light along the optical path of the system.

Light source 12 may include any suitable type of light-producing element. Examples include, but are not limited to, metal halide lamps, ultra-high-pressure (UHP) arc lamps, high-pressure mercury arc lamps, halogen lamps, halogen-tungsten lamps, lasers, diode lasers, etc. The system may also include one or more filters, such as an infrared (IR) or ultraviolet (UV) filter, to filter out unwanted parts of the emission spectra of the lamp.

Light produced by light source 12 may be channeled along an optical path or optical axis through an interface tube or spacer 16 to optical engine 14. Optical engine 14 may include filters, color wheels, lenses, mirrors, integrators, condensers, and other optical elements omitted from FIG. 1 for clarity.

Optical engine 14 further may include an image-producing element 18. Image-producing element 18 may comprise any suitable image-generation device, including, but not limited to, a digital micromirror (DMD), an LCD panel, reflective LCD panels, transmissive LCD panels, liquid crystal on silicon panels, micro-mirror devices such as digital light processors (DLPs), and/or a variety of other image producing devices. Image-producing element 18 may be configured to project light toward one or more mirrors or other optics, which, in turn, may be configured to reflect light toward a display surface.

Projection device 10 also may include one or more power sources 20. Power source 20 may be linked to light source 12, image-producing element 18, and other components of the projection device. Further, projection device 10 may include a blower 22 for creating a flow of cooling air through the interior of projection device 10.

As described above, light source 12 may include a light-producing element positioned within a mount. Further, light source 12 may also include a reflector for redirecting light from the light-producing element toward optical engine 14.

Figure 2:
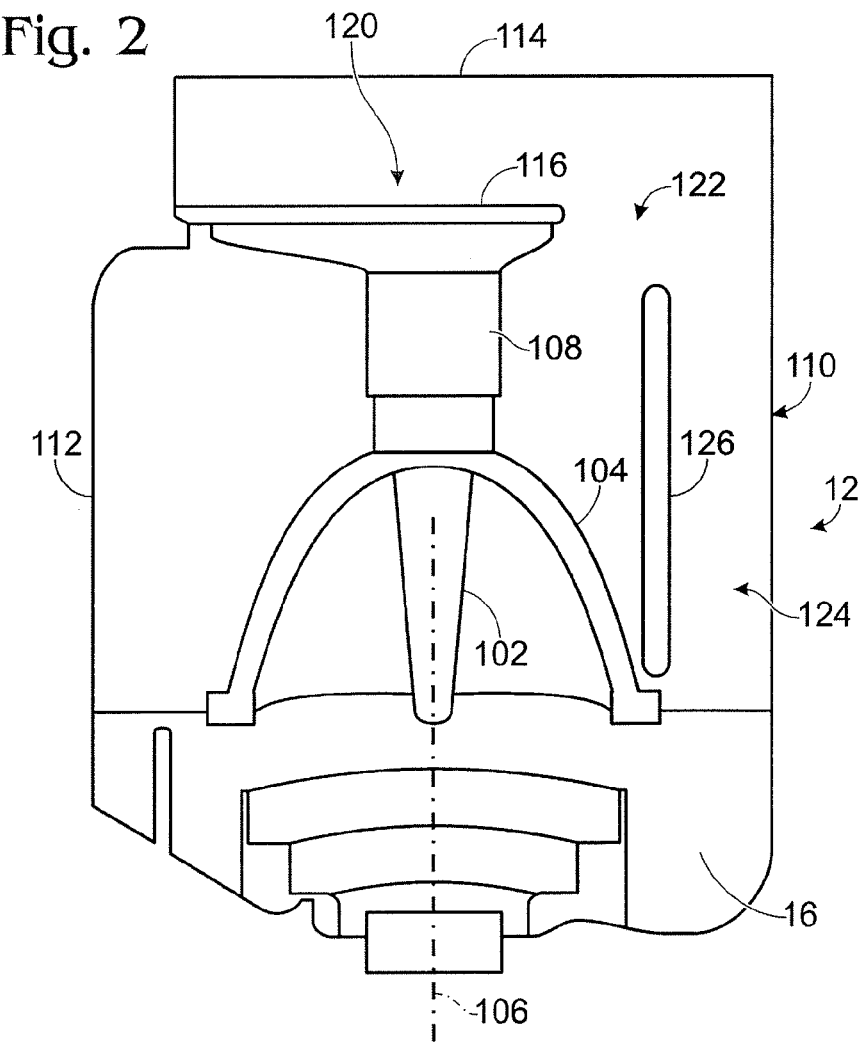
FIG. 2 illustrates a light source and a portion of a cooling system for a display device.
Figure 3:
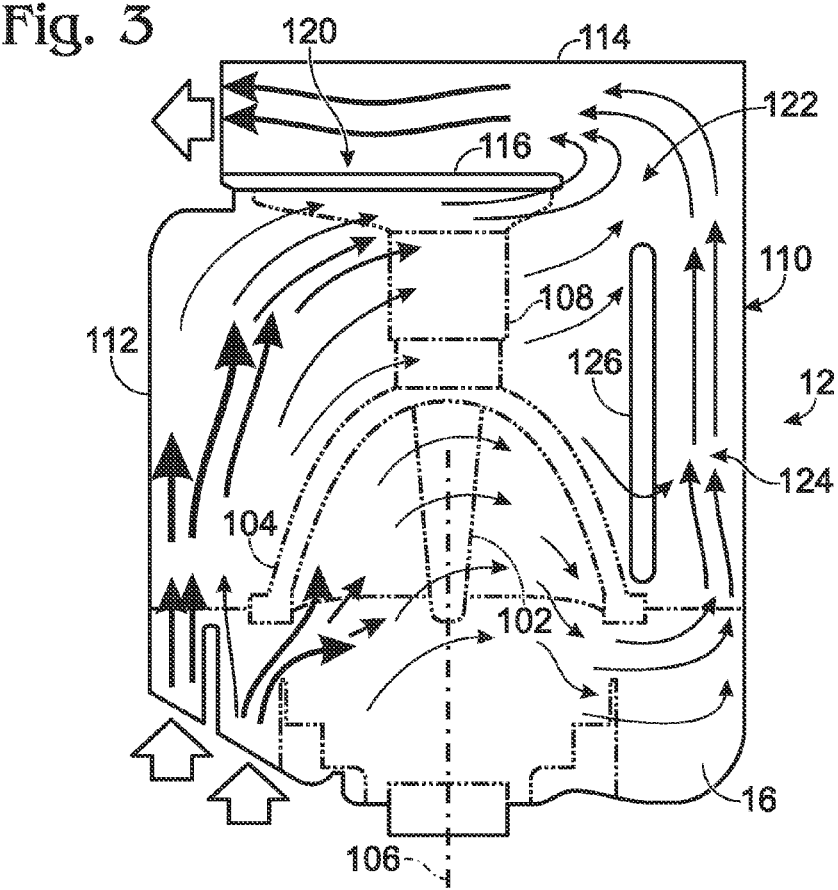
FIG. 3 is another view of the light source of FIG. 2, showing air flow patterns and relative air velocities within the light source.
Figure 4:
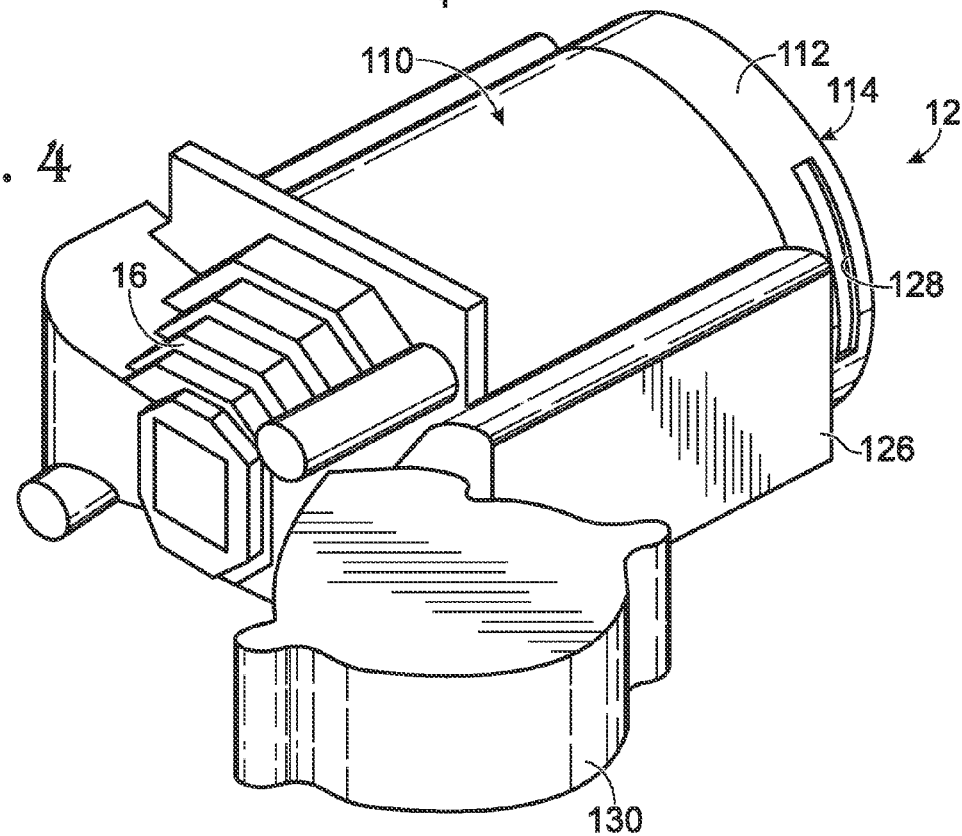
FIG. 4 is a perspective view of the light source and cooling system for a display device of FIG. 2.

FIGS. 2-4 further illustrate an exemplary embodiment of light source 12. FIG. 2 and 3 each shows a sectional view of light source 12, and FIG. 4 shows a perspective view.

Light source 12 includes a light-producing element 102 and a reflector 104 disposed spatially adjacent to light-producing element 102 such that light from light-producing element 102 is redirected along an optical axis 106 of light source 12. Light-producing element 102 and reflector 104 are supported by a base 108, which also may provide electrical insulation for electrical connections to light-producing element 102.

Light source 12 further includes a housing 110. Housing 110 substantially surrounds light-producing element 102, reflector 104 and base 108. In the depicted embodiment, housing 110 has a generally cylindrical configuration, with a side wall 112 and a rear wall 114. Housing 110 further may include an internal structure 116 allowing the attachment of housing 110 to an interface tube or other optical component. Internal structure 116 also may define an airflow channel within the interior of housing 110, as described in more detail below. The term "generally cylindrical" includes structures with a polygonal outer perimeter, curvilinear outer perimeter, and combinations thereof. However, it will be appreciated that housing 110 may have any other suitable geometry, including rectangular and/or other polygonal geometries.

Housing 110 may be formed at least partially from sheet metal. In some embodiments, housing 110 is formed entirely of sheet metal. The use of sheet metal in the construction of housing 110 may be inexpensive relative to conventional housings that utilize such materials as plastic, magnesium alloys, etc. Therefore, the use of sheet metal in the construction of housing 110 may reduce the overall costs of manufacture, and may facilitate high volume manufacturing.

As shown in FIG. 2, light-producing element 102 is substantially contained within housing 110. This may help to contain stray light by blocking light from escaping housing 110 into an interior portion of the display device. Similarly, if light-producing element 102 ruptures, housing 110 may help to contain glass or other particles from the ruptured light-producing element. Such containment may help to prevent the release of glass particles or the like into the device, and thereby may help to improve device safety. Furthermore, secondary shielding may be unnecessary.

Sheet metal housing 110 may further be configured to provide lamp improved cooling for both the front and rear portions of light source 12, including light-producing element 102, reflector 104, and base 108. For example, the use of sheet metal housing 110 may allow airflow channels to be optimized such that the lamp is able to run at a lower temperature than with conventional cooling strategies. Lower lamp operating temperatures may lead to longer lamp lifetimes, longer optimized lamp performance, and/or lower lamp rupture rates. Exemplary airflow patterns within light source 12 are explained in more detail below.

Besides potentially offering the improved ability to optimize airflow patterns, sheet metal housing 110 may also help to remove heat via thermal conduction and radiation. For example, housing 110 may be composed of thin sheet metal having a lower thermal conductivity and thermal mass. By balancing the airflow across inner and outer surfaces of reflector 104, sufficient cooling may be provided to allow use of a lower temperature lamp wire for light-producing element 102. The use of a lower temperature lamp wire may reduce the cost of the overall system.

As mentioned above, housing 110 may be configured to optimize airflow patterns through light source 12. FIG. 3 depicts patterns and relative velocities of airflow within housing 110, wherein a greater arrow thickness indicates a greater flow velocity. As described above, internal structure 116 defines an airflow channel 120 by forming a partial separation in an internal space of housing 110. Thus, internal structure 116 may also be referred to as a separator structure. In the depicted embodiment, base 108 is mounted to internal structure 116. However, it will be appreciated that base 108 may be mounted to any other suitable structure or structures. Internal structure 116 extends substantially across a rear portion of housing 110, and includes an opening 122 that allows air to flow between airflow channel 120 and other interior portions of housing 110. Blower 22 may then be configured to create a low pressure region in airflow channel 120, for example, by creating a high airflow velocity through airflow channel 120. As a result, a good airflow velocity is established around both light-producing element 102 and around the backside of reflector 104 and base 108. This air flow pattern results in continual cooling air flowing across both the burner and the rear arm. While airflow channel 120 is depicted as being located adjacent to rear wall 114 of housing 110, it will be appreciated that the airflow channel may be located adjacent to side wall 112 of housing 110 in alternative embodiments.

Other airflow channels, such as side airflow channel 124, may be formed via other structures 126 to achieve any desired airflow pattern and velocity distribution. Referring to FIG. 4, the depicted structure 126 takes the form of a channel defined in side wall 112 of housing 110. It will be understood that a desired airflow pattern may be formed from any suitable combination of internal structures and external wall structures. FIG. 4 also illustrates an airflow channel outlet 128, and an exemplary inlet duct structure 130. Inlet duct may be configured to draw air from an inlet vent formed in the outer casing of display device 10, from a location within the interior of display device 10, or from any other suitable location. Further, inlet duct 130 may include a blower for forcing cooling air into housing 110.

It is noted that the use of sheet metal in the construction of housing 110 may present various advantages compared to other materials. For example, the use of sheet metal for housing 110 may avoid issues of compliance with UV requirements of Underwriters Laboratories, and with outgassing issues associated with various other materials. Further, the use of sheet metal rather than a magnesium-containing material such as chromate plated magnesium also addresses other compliance concerns, such as WEEE (Waste Electrical and Electronic Equipment) compliance concerns.

Any suitable sheet metal may be used to form housing 110. Examples include, but are not limited to, electric furnace steel.

In the foregoing specification, various features are described with reference to specific embodiments thereof. It will, however, be evident that various modifications and changes can be made thereto without departing from the broader spirit and scope of the disclosure. The specification and drawings are, accordingly, to be regarded in an illustrative rather than a restrictive sense.

While the concepts disclosed herein are depicted and described in the context of light sources for projection devices, it will be appreciated that the concepts may be used in any other suitable image display device. Furthermore, it will be appreciated that the various embodiments of projection devices and light sources are exemplary in nature, and these specific embodiments are not to be considered in a limiting sense, because numerous variations are possible.

The subject matter of the present disclosure includes all novel and non-obvious combinations and subcombinations of the various features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the various features, functions, elements, and/or properties disclosed herein may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A light source for an image display device, comprising:
   a light-producing element;
   a reflector disposed around at least a portion of the light-producing element; the reflector having front surface facing the light-producing element and a rear surface facing away from the light-producing element;
   a housing substantially enclosing the reflector;
   an airflow inlet disposed spatially adjacent to a front edge of the reflector, wherein the airflow inlet is positioned to cause a first portion of air flowing into the housing to flow across the front surface of the reflector and a second portion of air flowing into the housing to flow across the rear surface of the reflector;
   an airflow channel within the housing defined adjacent an outer wall of the housing by the outer wall of the housing and a separator structure interior the outer wall of the housing; and
   an opening in the separator structure to allow airflow between the interior portion of the housing and the airflow channel.

2. The light source of claim 1, wherein the housing is formed from sheet metal.

3. The light source of claim 1, wherein the outer wall of the housing is a rear wall.

4. The light source of claim 1, wherein the separator structure is arranged generally perpendicularly to an optical axis of the light-producing element.

5. An image display device, comprising:
   a light source including a reflector and a light-producing element;
   the reflector having a front surface facing the light-producing element and a rear surface facing away from the light-producing element;
   an airflow inlet positioned to direct a first portion of air across the front surface of the reflector and a second portion of air across the rear surface of the reflector;
   a sheet metal housing including a rear outer wall, the sheet metal housing substantially enclosing the light source; and
   an airflow channel at least partially defined by the rear outer wall and a separator structure disposed within the sheet metal housing and located spatially adjacent to the rear outer wall.

6. The image display device of claim 5, wherein the separator structure is arranged generally perpendicularly to an optical axis of the light-producing element.

7. The image display device of claim 5, wherein the airflow inlet is disposed spatially adjacent to a front edge of the reflector.

* * * * *